(12) United States Patent
He et al.

(10) Patent No.: US 11,695,639 B2
(45) Date of Patent: Jul. 4, 2023

(54) METHOD AND APPARATUS FOR SEARCHING FOR MAINTENANCE END POINT (MEP), AND STORAGE MEDIUM

(71) Applicant: Suzhou Centec Communications Co., Ltd., Jiangsu (CN)

(72) Inventors: Zhichuan He, Jiangsu (CN); Wei Gu, Jiangsu (CN); Maocong Zhao, Jiangsu (CN); Jie Zhou, Jiangsu (CN); Haiqing Xu, Jiangsu (CN)

(73) Assignee: Suzhou Centec Communications Co., Ltd., Jiangsu (CN)

( * ) Notice: Subject to any disclaimer, the term of this patent is extended or adjusted under 35 U.S.C. 154(b) by 139 days.

(21) Appl. No.: 17/298,679

(22) PCT Filed: Nov. 18, 2019

(86) PCT No.: PCT/CN2019/119196
§ 371 (c)(1),
(2) Date: Jun. 22, 2021

(87) PCT Pub. No.: WO2020/114230
PCT Pub. Date: Jun. 11, 2020

(65) Prior Publication Data
US 2022/0045910 A1   Feb. 10, 2022

(30) Foreign Application Priority Data
Dec. 3, 2018   (CN) .......................... 201811466927.9

(51) Int. Cl.
*H04L 41/12* (2022.01)
*H04L 12/46* (2006.01)
(Continued)

(52) U.S. Cl.
CPC .......... *H04L 41/12* (2013.01); *H04L 12/4679* (2013.01); *H04L 41/04* (2013.01); *H04L 41/5003* (2013.01)

(58) Field of Classification Search
CPC ................................ H04L 41/12; H04L 41/04
(Continued)

(56) References Cited

U.S. PATENT DOCUMENTS

| 2008/0049630 | A1* | 2/2008 | Kozisek | H04L 43/0852 370/250 |
| 2012/0303835 | A1* | 11/2012 | Kempf | H04L 41/0695 709/235 |
| 2016/0344630 | A1 | 11/2016 | Lee et al. | |

FOREIGN PATENT DOCUMENTS

| CN | 101197662 A | 6/2008 |
| CN | 105933231 A | 9/2016 |

(Continued)

OTHER PUBLICATIONS

International Search Report for corresponding application PCT/CN2019/119196 filed Nov. 18, 2019; dated Apr. 22, 2020.
(Continued)

*Primary Examiner* — Adnan M Mirza
(74) *Attorney, Agent, or Firm* — Gang Yu

(57) ABSTRACT

Provided is a method and apparatus for searching for a Maintenance End Point (MEP), and a storage medium. The method includes that: a chip of the MEP parses an obtained packet; the chip of the MEP determines whether a field of the parsed packet matches a field in a combination of a port and a Virtual Local Area Network (VLAN); and in a case where the field of the parsed packet matches the field in the combination of the port and the VLAN, the chip of the MEP determines that the MEP is found successfully.

14 Claims, 3 Drawing Sheets

---

A chip of the MEP parses an obtained packet — S102

The chip of the MEP determines whether a field of the parsed packet matches a field in a combination of a port and a VLAN — S104

In a case where the field of the parsed packet matches the field in the combination of the port and the VLAN, the chip of the MEP determines that the MEP is found successfully — S106

(51) Int. Cl.
*H04L 41/04* (2022.01)
*H04L 41/5003* (2022.01)
(58) Field of Classification Search
USPC .......................................................... 709/223
See application file for complete search history.

(56) References Cited

FOREIGN PATENT DOCUMENTS

| | | |
|---|---|---|
| CN | 106209640 A | 12/2016 |
| CN | 109587030 A | 4/2019 |

OTHER PUBLICATIONS

CN search reprot dated Dec. 3, 2018 re: Application No. 201811466927.9.

* cited by examiner

A chip of the MEP parses an obtained packet — S102

The chip of the MEP determines whether a field of the parsed packet matches a field in a combination of a port and a VLAN — S104

In a case where the field of the parsed packet matches the field in the combination of the port and the VLAN, the chip of the MEP determines that the MEP is found successfully — S106

METHOD AND APPARATUS FOR SEARCHING FOR MAINTENANCE END POINT (MEP), AND STORAGE MEDIUM

CROSS REFERENCE

This application is a National Stage Filing of the PCT International Application No. PCT/CN2019/119196 filed on Nov. 18, 2019, which claims priority to Chinese Application No. 201811466927.9 filed on Dec. 3, 2018, the entirety of which is herein incorporated by reference.

TECHNICAL FIELD

The disclosure relates to the field of computers, and in particular to a method and apparatus for searching for a Maintenance End Point (MEP), and a storage medium.

BACKGROUND

In a related art, the MEG for Ethernet Operation Administration and Maintenance (OAM) is searched in the following ways.
 (1) The search for the MEP for Ethernet OAM is implemented by means of software. However, implementing the search for the MEP for Ethernet OAM by means of software has a high requirement on the load of a Central Processing Unit (CPU).
 (2) A chip may perform matching, by means of an Access Control List (ACL), on information in a packet, such as Virtual Local Area Network (VLAN), level, and ingress port, and identify the packet as an OAM packet for processing. However, this way not only has low performance, but also consumes ACL resources.

There are no effective solutions for the above problems in the related art.

SUMMARY

Embodiments of the disclosure provide a method and apparatus for searching for a MEP, and a storage medium, which may at least solve the problem in the related art of overload caused by searching for the MEP for Ethernet OAM by means of software.

According to an embodiment of the disclosure, a method for searching for a MEP is provided. The method may include that: a chip of the MEP parses an obtained packet; the chip of the MEP determines whether a field of the parsed packet matches a field in a combination of a port and a VLAN; and in a case where the field of the parsed packet matches the field in the combination of the port and the VLAN, the chip of the MEP determines that the MEP is found successfully.

According to another embodiment of the disclosure, an apparatus for searching for a MEP is provided. The apparatus is applied to a chip of the MEP and includes: a parsing module, configured to parse the obtained packet; a determining module, configured to determine whether the field of the parsed packet matches the field in the combination of the port and the VLAN; and a searching module, configured to determine, in a case where the field of the parsed packet matches the field in the combination of the port and the VLAN, that the MEP is found successfully.

According to yet another embodiment of the disclosure, a storage medium is provided. The storage medium stores a computer program. The computer program is configured to execute, at runtime, the above method.

Through the embodiments of the disclosure, whether the field of the parsed packet matches the field in the combination of the port and the VLAN is determined based on the chip of the MEP, and in a case where the field of the parsed packet matches the field in the combination of the port and the VLAN, it is determined that the MEP is found successfully. By virtue of the scheme, searching for the MEP by means of software is avoided, thereby solving the problem in the related art of overload caused by searching for the MEP for Ethernet OAM by means of software, and achieving the effect of improving the performance.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMBODIMENTS

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

First Embodiment

Figures 1, 2:
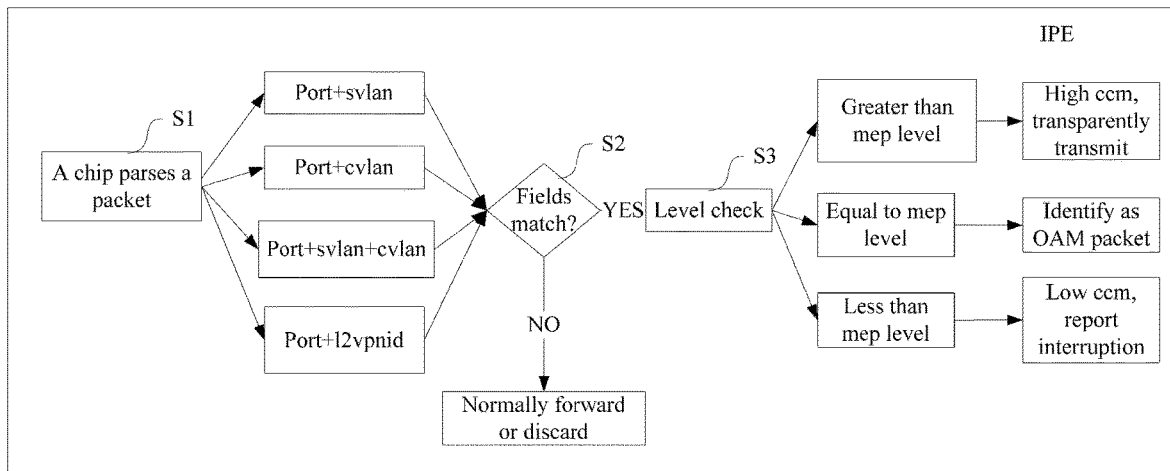
FIG. 1 is a flowchart of a method for searching for a MEP according to an embodiment of the disclosure.
FIG. 2 is a flowchart of searching for a MEP based on a chip of a Down MEP according to an embodiment of the disclosure.

In the present embodiment, a method for searching for a MEP is provided. FIG. 1 is a flowchart of a method for searching for a MEP according to an embodiment of the disclosure. As shown in FIG. 1, the flow includes the following operations.

At operation S102, a chip of the MEP parses an obtained packet.

At operation S104, the chip of the MEP determines whether a field of the parsed packet matches a field in a combination of a port and a VLAN.

At operation S106, in a case where the field of the parsed packet matches the field in the combination of the port and the VLAN, the chip of the MEP determines that the MEP is found successfully.

Through operations S102 to S106, whether the field of the parsed packet matches the field in the combination of the port and the VLAN is determined based on the chip of the MEP, and in a case where the field of the parsed packet matches the field in the combination of the port and the VLAN, it is determined that the MEP is found successfully. By virtue of the scheme, searching for the MEP by means of software is avoided, thereby solving the problem in the related art of overload caused by searching for the MEP for Ethernet OAM by means of software, and achieving the effect of improving the performance.

In an exemplary implementation of the present embodiment, in operation S104 of the present embodiment, the chip of the MEP determines whether the field of the parsed packet matches the field in the combination of the port and the VLAN in at least one of the following ways.

(1) The chip of the MEP determines whether the field of the parsed packet matches the field in the combination of the port and a serving VLAN.

(2) The chip of the MEP determines whether the field of the parsed packet matches the field in the combination of the port and a user VLAN.

(3) The chip of the MEP determines whether the field of the parsed packet matches the field in the combination of the port, the serving VLAN and the user VLAN.

(4) The chip of the MEP determines whether the field of the parsed packet matches the field in the combination of the port and a Layer 2 Virtual Private Network Identity (L2VPN ID).

It is to be noted that the fields in the combination of the port and the VLAN involved in the above ways (1) to (4) include globalSrcPort, isCvlan, isFid, vlanId and cvlanId of entry DsEgressXcOamEthHashKey. In the way (1), globalSrcPort+vlanId+(isCvlan=0, isFid=0, cvlanId=0). In the way (2), port+cvlan corresponds to: globalSrcPort+cvlanId+(isCvlan=1, isFid=0, vlanId=0). In the way (3), port+svlan+cvlan corresponds to: the matching condition may be embodied as globalSrcPort+cvlanId+vlanId(isCvlan=0, isFid=0). In the way (4), port+l2vpnid corresponds to: the matching condition may be embodied as globalSrcPort+vlanId(isCvlan=0, isFid=1, cvlanId=0).

In another exemplary implementation of the present embodiment, the method of the present embodiment may further include the following operations.

At operation S108, after the chip of the MEP determines that the MEP is found successfully, the chip of the MEP compares a maintenance domain level value of the parsed packet, whose field matches the field in the combination of the port and the VLAN, with a preset maintenance domain level value.

At operation S110, the chip of the MEP performs a corresponding packet processing operation according to the comparison result.

Through operations S108 and S110, the packets with different maintenance domain level values can be processed correspondingly.

The way that the chip of the MEP performs the corresponding packet processing operation according to the comparison result involved in operation S110 may include the following operations in an exemplary implementation of the present embodiment.

At operation S110-11, in a case where the maintenance domain level value of the parsed packet, whose field matches the field in the combination of the port and the VLAN, is greater than the preset maintenance domain level value, the chip of the MEP transparently transmits the parsed packet whose field matches the field in the combination of the port and the VLAN.

At operation S110-12, in a case where the maintenance domain level value of the parsed packet, whose field matches the field in the combination of the port and the VLAN, is equal to the preset maintenance domain level value, the chip of the MEP identifies the parsed packet whose field matches the field in the combination of the port and the VLAN as an OAM packet.

At operation S110-13, in a case where the maintenance domain level value of the parsed packet, whose field matches the field in the combination of the port and the VLAN, is less than the preset maintenance domain level value, the chip of the MEP interrupts transmission of the parsed packet whose field matches the field in the combination of the port and the VLAN.

It can be seen from operations S110-11 to S110-13 that corresponding processing modes can be used for the packets with different maintenance domain level values.

It is to be noted that the MEP involved in the present embodiment includes: a Down MEP and an Up MEP. Based on this, in a case where the MEP is the Down MEP, in an Ingress Process Engine (IPE) of the chip, the operation of determining whether the field of the parsed packet matches the field in the combination of the port and the VLAN is performed, and the operation of comparing the maintenance domain level value of the parsed packet, whose field matches the field in the combination of the port and the VLAN, with the preset maintenance domain level value is performed. In a case where the MEP is the Up MEP, in an Egress Process Engine (EPE) of the chip, the operation of determining whether the field of the parsed packet matches the field in the combination of the port and the VLAN is performed, and the operation of comparing the maintenance domain level value of the parsed packet, whose field matches the field in the combination of the port and the VLAN, with the preset maintenance domain level value is performed.

In a case where the MEP is the Up MEP, after the chip of the MEP parses the obtained packet, the method of the present embodiment further includes that: the chip of the Up MEP forwards the parsed packet to the EPE through a Forwarding Engine (FWD).

Taking the Down MEP and the Up MEP as an example, the disclosure is illustrated in specific application scenarios.

An exemplary implementation (1) is the way of searching for the MEP based on the chip of the Down MEP.

FIG. 2 is a flowchart of searching for a MEP based on a chip of a Down MEP according to an embodiment of the disclosure. As shown in FIG. 2, the method includes the following operations.

At operation S1, the packet is parsed in the IPE of the chip to obtain port, VLAN and MEG level.

At operation S2, the search based on port+svlan, port+cvlan, port+svlan+cvlan and port+l2vpnid is supported. In a case where the MEP is found successfully, operation S3 is performed.

Control is performed through five fields, namely globalSrcPort, isCvlan, isFid, vlanId and cvlanId, of the entry DsEgressXcOamEthHashKey, as follows:

port+svlan corresponds to: globalSrcPort+vlanId+(isCvlan=0, isFid=0, cvlanId=0);

port+cvlan corresponds to: globalSrcPort+cvlanId+(isCvlan=1, isFid=0, vlanId=0);

port+svlan+cvlan corresponds to: globalSrcPort+cvlanId+vlanId(isCvlan=0, isFid=0); and port+l2vpnid corresponds to: globalSrcPort+vlanId(isCvlan=0, isFid=1, cvlanId=0).

At operation S3, each MEP has an MEG level value, which is saved in the entry DsMa.mdLvl, and the level in the packet needs to be compared with the DsMa.mdLvl value of the MEP. Different behaviors are to be performed for different cases, i.e., for the cases where the level in the packet is greater than the DsMa.mdLvl value of the MEP, the level in the packet is less than the DsMa.mdLvl value of the MEP, or the level in the packet is equal to the DsMa.mdLvl value of the MEP.

An exemplary implementation (2) is the way of searching for the MEP based on the chip of the Up MEP.

Figure 3:
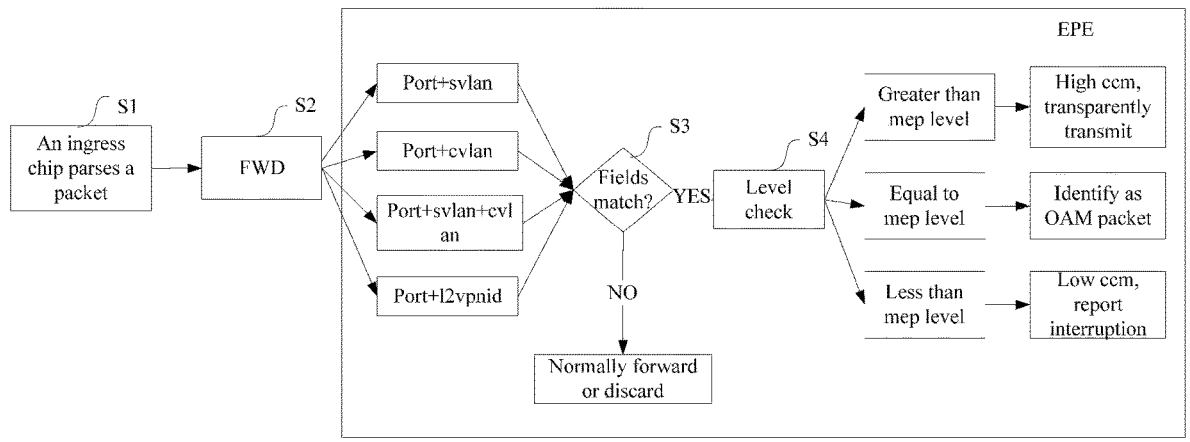
FIG. 3 is a flowchart of searching for a MEP based on a chip of an Up MEP according to an embodiment of the disclosure.

FIG. 3 is a flowchart of searching for a MEP based on a chip of an Up MEP according to an embodiment of the disclosure. As shown in FIG. 3, the method includes the following operations.

At operation S1, the packet is parsed in the IPE of the chip to obtain port, VLAN and level.

At operation S2, parsed packet information is forwarded through the FWD.

At operation S3, the search based on port+svlan, port+cvlan, port+svlan+cvlan and port+l2vpnid is supported. In a case where the MEP is found successfully, operation S4 is performed.

Control is performed through five fields, namely globalSrcPort, isCvlan, isFid, vlanId and cvlanId, of the entry DsEgressXcOamEthHashKey, as follows:
port+svlan corresponds to: globalSrcPort+vlanId+(isCvlan=0, isFid=0, cvlanId=0);
port+cvlan corresponds to: globalSrcPort+cvlanId+(isCvlan=1, isFid=0, vlanId=0);
port+svlan+cvlan corresponds to: globalSrcPort+cvlanId+vlanId(isCvlan=0, isFid=0); and
port+l2vpnid corresponds to: globalSrcPort+vlanId(isCvlan=0, isFid=1, cvlanId=0).

At operation S4, each MEP has an MEG level value, which is saved in the entry DsMa.mdLvl, and the level in the packet needs to be compared with the DsMa.mdLvl value of the MEP. Different behaviors are to be performed for different cases, i.e., for the cases where the level in the packet is greater than the DsMa.mdLvl value of the MEP, the level in the packet is less than the DsMa.mdLvl value of the MEP, or the level in the packet is equal to the DsMa.mdLvl value of the MEP.

It can be seen that the way of searching for the Up MEP is basically similar to the way of searching for the Down MEP, and the only difference lies in that after the Up MEP receives the packet, the packet is first processed through the FWD, and the search for the MEP and the check of the level are processed in the EPE.

It is to be noted that the Down MEP and the Up MEP are distinguished by the entry DsEthMep.isUp. In a case where the entry DsEthMep.isUp is set 1, the MEP is the Up MEP; and in a case where the entry DsEthMep.isUp is set 0, the MEP is the Down MEP.

Through the exemplary implementations of the embodiments of the disclosure, a method for searching for the MEP for Ethernet OAM may be implemented in the NP. The method supports the Down MEP and the Up MEP, and can correctly process a low Continuity Check Message (CCM) and a high CCM, thereby greatly improving the performance and specification.

Through the above description of implementations, those having ordinary skill in the art can clearly know that the method according to the above embodiments may be implemented by means of software plus a necessary common hardware platform, certainly by means of hardware; but in many cases, the former is the better implementation. Based on this understanding, the technical solution of the disclosure substantially or the part making a contribution to the conventional art can be embodied in the form of software product; the computer software product is stored in a storage medium (for example, a Read-Only Memory (ROM)/Random Access Memory (RAM), a magnetic disk, and a compact disc) and includes a number of instructions to make a computer device (which can be a personal computer, a server or a network device, etc.) perform all or part of the method in each embodiment of the disclosure.

Second Embodiment

In the present embodiment, an apparatus for searching for a MEP is also provided. The apparatus is configured to implement the above embodiments and exemplary implementations. The embodiments which have been elaborated will not be repeated here. The term "module" used below can implement a combination of software and/or hardware with an intended function. Although the apparatus described in the following embodiment is implemented through software better, the implementation through hardware or a combination of software and hardware is possible and conceived.

Figure 4:
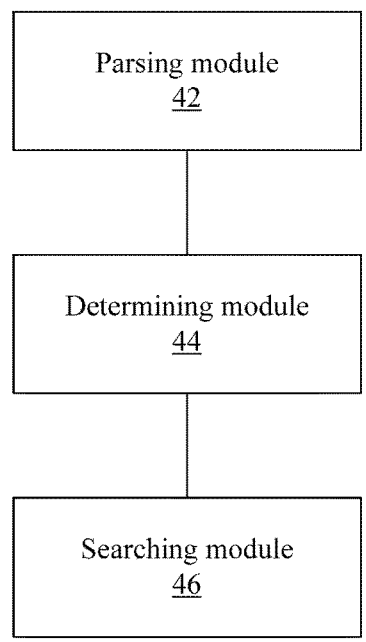
FIG. 4 is a structural block diagram of an apparatus for searching for a MEP according to an embodiment of the disclosure.

FIG. 4 is a structural block diagram of an apparatus for searching for a MEP according to an embodiment of the disclosure. As shown in FIG. 4, the apparatus is applied to a chip of the MEP and includes: a parsing module 42, which configured to parse the obtained packet; a determining module 44, which is coupled with the parsing module 42 and is configured to determine whether the field of the parsed packet matches the field in the combination of the port and the VLAN; and a searching module 46, which is coupled with the determining module 44 and is configured to determine, in a case where the field of the parsed packet matches the field in the combination of the port and the VLAN, that the MEP is found successfully.

In some exemplary implementations, the determining module 44 includes: a first determining unit, configured to determine whether the field of the parsed packet matches the field in the combination of the port and the serving VLAN; and/or, a second determining unit, configured to determine whether the field of the parsed packet matches the field in the combination of the port and the user VLAN; and/or, a third determining unit, configured to determine whether the field of the parsed packet matches the field in the combination of the port, the serving VLAN and the user VLAN; and/or, a fourth determining unit, configured to determine whether the field of the parsed packet matches the field in the combination of the port and the L2VPN ID.

Figure 5:
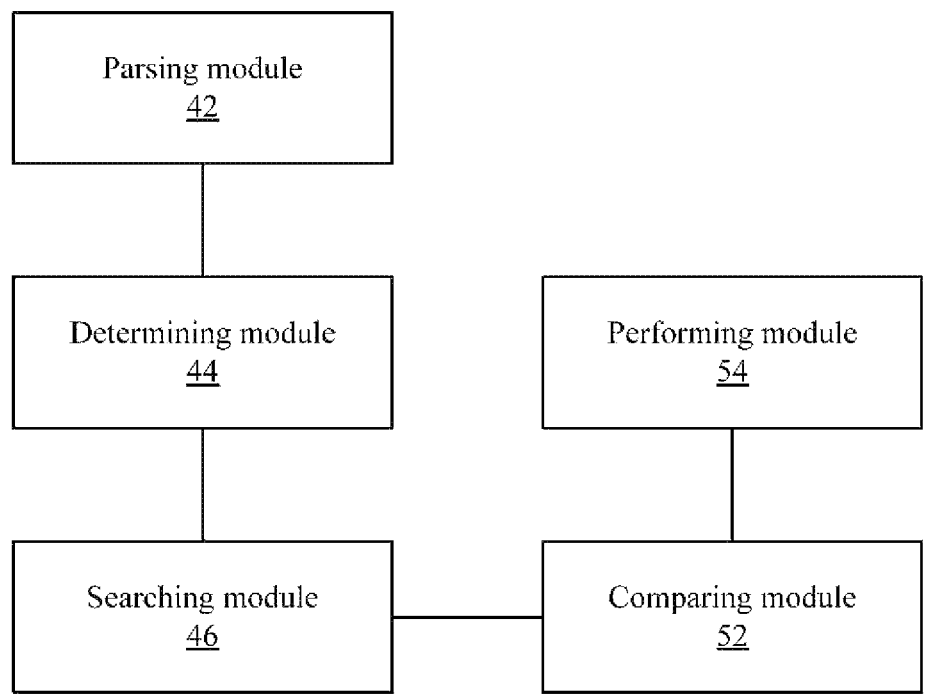
FIG. 5 is an exemplary structural block diagram of an apparatus for searching for a MEP according to an embodiment of the disclosure.

FIG. 5 is an exemplary structural block diagram of an apparatus for searching for a MEP according to an embodiment of the disclosure. As shown in FIG. 5, the apparatus further includes: a comparing module 52, which is coupled with the searching module 46 and is configured to compare, after it is determined that the MEP is found successfully, the maintenance domain level value of the parsed packet, whose field matches the field in the combination of the port and the VLAN, with the preset maintenance domain level value; and a performing module 54, which is coupled with the comparing module 52 and is configured to perform the corresponding packet processing operation according to the comparison result.

In some exemplary implementations, the performing module 54 includes: a transparently transmitting unit, which is configured to transparently transmit, in a case where the maintenance domain level value of the parsed packet, whose field matches the field in the combination of the port and the VLAN, is greater than the preset maintenance domain level value, the parsed packet whose field matches the field in the combination of the port and the VLAN; an identifying unit, which is configured to identify, in a case where the maintenance domain level value of the parsed packet, whose field matches the field in the combination of the port and the VLAN, is equal to the preset maintenance domain level value, the parsed packet whose field matches the field in the combination of the port and the VLAN as the OAM packet; and an interrupting unit, which is configured to interrupt, in a case where the maintenance domain level value of the parsed packet, whose field matches the field in the combination of the port and the VLAN, is less than the preset maintenance domain level value, transmission of the parsed packet whose field matches the field in the combination of the port and the VLAN.

It is to be noted that, each of the above modules may be implemented by software or hardware. For the latter, the each of the above modules may be implemented by, but not limited to, the following way: all of the above modules are in the same processor, or, the above modules are respectively in different processors in form of any combination.

Third Embodiment

The embodiments of the disclosure provide a storage medium. In an exemplary embodiment, the storage medium may be set to store program codes for performing the following operations.

At operation S1, an obtained packet is parsed.

At operation S2, it is determined whether a field of the parsed packet matches a field in a combination of a port and a VLAN.

At operation S3, in a case where the field of the parsed packet matches the field in the combination of the port and the VLAN, it is determined that the MEP is found successfully.

In some exemplary implementations, the storage medium is also set to store a program code for executing the following operations.

At operation S1, after it is determined that the MEP is found successfully, a maintenance domain level value of the parsed packet, whose field matches the field in the combination of the port and the VLAN, is compared with a preset maintenance domain level value.

At operation S2, a corresponding packet processing operation is performed according to the comparison result.

In the present embodiment, the storage media may include, but may not be limited to, a USB flash disk, an ROM, an RAM, a mobile hard disk, a magnetic disk, a compact disc, and other media capable of storing the program codes.

Optionally, the specific examples in the present embodiment may refer to the examples described in the above embodiments and alternative embodiments, and will not be repeated here in the present embodiment.

It is apparent that those skilled in the art should appreciate that the above modules and operations of the disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described operations may be executed in an order different from that described here; or they are made into integrated circuit modules, respectively; or multiple modules and operations of them are made into a single integrated circuit module for implementation. Therefore, the disclosure is not limited to any particular combination of hardware and software.

The above is only the preferred embodiments of the disclosure and not intended to limit the disclosure; for those skilled in the art, the disclosure may have various modifications and changes. Any modifications, equivalent replacements, improvements and the like within the spirit and principle of the disclosure should fall within the protection scope of the claims of the disclosure.

INDUSTRIAL APPLICABILITY

Through the embodiments of the disclosure, whether the field of the parsed packet matches the field in the combination of the port and the VLAN is determined based on the chip of the MEP, and in a case where the field of the parsed packet matches the field in the combination of the port and the VLAN, it is determined that the MEP is found successfully. By virtue of the scheme, searching for the MEP by means of software is avoided, thereby solving the problem in the related art of overload caused by searching for the MEP for Ethernet OAM by means of software, and achieving the effect of improving the performance.

What is claimed is:

1. A method for searching for a Maintenance End Point (MEP), the method comprising:

parsing, by a chip of the MEP, an obtained packet;

determining, by the chip of the MEP, whether a field of the parsed packet matches a field in a combination of a port and a Virtual Local Area Network (VLAN);

in a case where the field of the parsed packet matches the field in the combination of the port and the VLAN, determining, by the chip of the MEP, that the MEP is found successfully;

comparing, by the chip of the MEP after it is determined that the MEP is found successfully, a maintenance domain level value of the parsed packet, whose field matches the field in the combination of the port and the VLAN, with a preset maintenance domain level value; and performing, by the chip of the MEP, a corresponding packet processing operation according to the comparison result, wherein performing, by the chip of the MEP, the corresponding packet processing operation according to the comparison result comprises: in a case where the maintenance domain level value of the parsed packet, whose field matches the field in the combination of the port and the VLAN, is greater than the preset maintenance domain level value, transparently transmitting, by the chip of the MEP, the parsed packet whose field matches the field in the combination of the port and the VLAN; in a case where the maintenance domain level value of the parsed packet, whose field matches the field in the combination of the port and the VLAN, is equal to the preset maintenance domain level value, identifying, by the chip of the MEP, the parsed packet whose field matches the field in the combination of the port and the VLAN as an Operation Administration and Maintenance (OAM) packet; in a case where the maintenance domain level value of the parsed packet, whose field matches the field in the combination of the port and the VLAN, is less than the preset maintenance domain level value, interrupting, by the chip of the MEP, transmission of the parsed packet whose field matches the field in the combination of the port and the VLAN.

2. The method according to claim 1, wherein determining, by the chip of the MEP, whether the field of the parsed packet matches the field in the combination of the port and the VLAN comprises at least one of:
   determining, by the chip of the MEP, whether the field of the parsed packet matches the field in the combination of the port and a serving VLAN;
   determining, by the chip of the MEP, whether the field of the parsed packet matches the field in the combination of the port and a user VLAN;
   determining, by the chip of the MEP, whether the field of the parsed packet matches the field in the combination of the port, the serving VLAN and the user VLAN; and
   determining, by the chip of the MEP, whether the field of the parsed packet matches the field in the combination of the port and a Layer 2 Virtual Private Network Identity (L2VPN ID).

3. The method according to claim 1, wherein the MEP comprises: a Down MEP or an Up MEP.

4. The method according to claim 3, wherein
   in a case where the MEP is the Down MEP, the operation of determining whether the field of the parsed packet matches the field in the combination of the port and the VLAN is performed in an Ingress Process Engine (IPE) of the chip;
   in a case where the MEP is the Up MEP, the operation of determining whether the field of the parsed packet matches the field in the combination of the port and the VLAN is performed in an Egress Process Engine (EPE) of the chip.

5. The method according to claim 4, wherein in a case where the MEP is the Up MEP, after parsing, by the chip of the MEP, the obtained packet, the method further comprises:
   forwarding, by the chip of the Up MEP, the parsed packet to the EPE through a Forwarding Engine (FWD).

6. An apparatus for searching for a Maintenance End Point (MEP), applied to a chip of the MEP and comprising a memory storing instructions and a processor in communication with the memory, wherein the processor is configured to execute the instructions to:
   parse an obtained packet;
   determine whether a field of the parsed packet matches a field in a combination of a port and a Virtual Local Area Network (VLAN);
   determine, in a case where the field of the parsed packet matches the field in the combination of the port and the VLAN, that the MEP is found successfully;
   compare, after it is determined that the MEP is found successfully, a maintenance domain level value of the parsed packet, whose field matches the field in the combination of the port and the VLAN, with a preset maintenance domain level value; and
   perform a corresponding packet processing operation according to the comparison result, wherein the processor, when being configured to execute the instructions to perform the corresponding packet processing operation according to the comparison result, is configured to: in a case where the maintenance domain level value of the parsed packet, whose field matches the field in the combination of the port and the VLAN, is greater than the preset maintenance domain level value, transparently transmit the parsed packet whose field matches the field in the combination of the port and the VLAN; in a case where the maintenance domain level value of the parsed packet, whose field matches the field in the combination of the port and the VLAN, is equal to the preset maintenance domain level value, identify the parsed packet whose field matches the field in the combination of the port and the VLAN as an Operation Administration and Maintenance (OAM) packet; in a case where the maintenance domain level value of the parsed packet, whose field matches the field in the combination of the port and the VLAN, is less than the preset maintenance domain level value, interrupt transmission of the parsed packet whose field matches the field in the combination of the port and the VLAN.

7. The apparatus according to claim 6, wherein the processor, when being configured to execute the instructions to determine whether the field of the parsed packet matches the field in the combination of the port and the VLAN, is configured to execute at least one of:
   determining whether the field of the parsed packet matches the field in the combination of the port and a serving VLAN;
   determining whether the field of the parsed packet matches the field in the combination of the port and a user VLAN;
   determining whether the field of the parsed packet matches the field in the combination of the port, the serving VLAN and the user VLAN; and
   determining whether the field of the parsed packet matches the field in the combination of the port and a Layer 2 Virtual Private Network Identity (L2VPN ID).

8. A non-transitory computer-readable storage medium, storing a computer program, wherein the computer program is configured to execute, at runtime, the following operations:
   parsing, by a chip of the MEP, an obtained packet;
   determining, by the chip of the MEP, whether a field of the parsed packet matches a field in a combination of a port and a Virtual Local Area Network (VLAN;
   in a case where the field of the parsed packet matches the field in the combination of the port and the VLAN, determining, by the chip of the MEP, that the MEP is found successfully;
   comparing, by the chip of the MEP after it is determined that the MEP is found successfully, a maintenance domain level value of the parsed packet, whose field matches the field in the combination of the port and the VLAN, with a preset maintenance domain level value; and
   performing, by the chip of the MEP, a corresponding packet processing operation according to the comparison result, wherein performing, by the chip of the MEP, the corresponding packet processing operation according to the comparison result comprises: in a case where the maintenance domain level value of the parsed packet, whose field matches the field in the combination of the port and the VLAN, is greater than the preset maintenance domain level value, transparently transmitting, by the chip of the MEP, the parsed packet whose field matches the field in the combination of the port and the VLAN; in a case where the maintenance domain level value of the parsed packet, whose field matches the field in the combination of the port and the VLAN, is equal to the preset maintenance domain level value, identifying, by the chip of the MEP, the parsed packet whose field matches the field in the combination of the port and the VLAN as an Operation Administration and Maintenance (OAM) packet; in a case where the maintenance domain level value of the parsed packet, whose field matches the field in the combination of the port and the VLAN, is less than the preset maintenance domain level value, interrupting, by the chip of the MEP, transmission of the parsed packet whose field matches the field in the combination of the port and the VLAN.

9. The method according to claim 3, wherein in a case where the MEP is the Down MEP, the operation of comparing the maintenance domain level value of the parsed packet, whose field matches the field in the combination of the port and the VLAN, with the preset maintenance domain level value is performed in the IPE of the chip;

in a case where the MEP is the Up MEP, the operation of comparing the maintenance domain level value of the parsed packet, whose field matches the field in the combination of the port and the VLAN, with the preset maintenance domain level value is performed in the EPE of the chip.

10. The method according to claim 9, wherein in a case where the MEP is the Up MEP, after parsing, by the chip of the MEP, the obtained packet, the method further comprises:

forwarding, by the chip of the Up MEP, the parsed packet to the EPE through a Forwarding Engine (FWD).

11. The apparatus according to claim 6, wherein the MEP comprises: a Down MEP or an Up MEP.

12. The apparatus according to claim 11, wherein in a case where the MEP is the Down MEP, the processor is configured to determine whether the field of the parsed packet matches the field in the combination of the port and the VLAN in an Ingress Process Engine (IPE) of the chip;

in a case where the MEP is the Up MEP, the processor is configured to determine whether the field of the parsed packet matches the field in the combination of the port and the VLAN in an Egress Process Engine (EPE) of the chip.

13. The apparatus according to claim 12, wherein in a case where the MEP is the Up MEP, the processor is configured to execute the instructions to, after parsing the obtained packet, forward the parsed packet to the EPE through a Forwarding Engine (FWD).

14. The apparatus according to claim 11, wherein in a case where the MEP is the Down MEP, the processor is configured to compare the maintenance domain level value of the parsed packet, whose field matches the field in the combination of the port and the VLAN, with the preset maintenance domain level value in the IPE of the chip;

in a case where the MEP is the Up MEP, the processor is configured to compare the maintenance domain level value of the parsed packet, whose field matches the field in the combination of the port and the VLAN, with the preset maintenance domain level value in the EPE of the chip.

* * * * *